(12) United States Patent
Doswald

(10) Patent No.: US 8,134,640 B2
(45) Date of Patent: Mar. 13, 2012

(54) VIDEO PROCESSOR ARCHITECTURE AND METHOD FOR FRAME RATE CONVERSION

(75) Inventor: Daniel Doswald, Munich (DE)

(73) Assignee: Broadcom Corporation, Irvine, CA (US)

( * ) Notice: Subject to any disclaimer, the term of this patent is extended or adjusted under 35 U.S.C. 154(b) by 1443 days.

(21) Appl. No.: 11/616,188

(22) Filed: Dec. 26, 2006

(65) Prior Publication Data

US 2008/0151108 A1  Jun. 26, 2008

(51) Int. Cl.
*H04N 7/01* (2006.01)
(52) U.S. Cl. ........................................... 348/441
(58) Field of Classification Search .................. 348/441, 348/448, 700, 701, 449, 458, 459, 445, 447, 348/910; 375/240.21, 240.25
See application file for complete search history.

(56) References Cited

U.S. PATENT DOCUMENTS

| | | | |
|---|---|---|---|
| 5,936,676 A | 8/1999 | Ledinh et al. | |
| 6,111,610 A * | 8/2000 | Faroudja | 348/441 |
| 6,466,624 B1 * | 10/2002 | Fogg | 375/240.27 |
| 6,658,056 B1 * | 12/2003 | Duruoz et al. | 375/240 |
| 6,728,317 B1 * | 4/2004 | Demos | 375/240.21 |
| 6,928,196 B1 * | 8/2005 | Bradley et al. | 382/300 |
| 7,075,581 B1 | 7/2006 | Ozgen et al. | |
| 7,164,431 B1 * | 1/2007 | Chu et al. | 345/636 |
| 7,250,979 B2 * | 7/2007 | Choi | 348/441 |
| 7,346,112 B2 * | 3/2008 | Okawahara et al. | 375/240.25 |
| 7,349,029 B1 * | 3/2008 | Chou | 348/448 |
| 7,496,236 B2 * | 2/2009 | Fogg | 382/233 |
| 7,557,861 B2 * | 7/2009 | Wyman | 348/441 |
| 2002/0176506 A1 * | 11/2002 | Ferreira Florencio et al. | 375/240.25 |
| 2002/0196857 A1 * | 12/2002 | Kono et al. | 375/240.25 |
| 2005/0168653 A1 * | 8/2005 | Wyman | 348/700 |
| 2005/0169554 A1 | 8/2005 | Neuman | |
| 2005/0243215 A1 | 11/2005 | Doswald et al. | |
| 2006/0078293 A1 | 4/2006 | Wyman et al. | |
| 2008/0088746 A1 * | 4/2008 | Walls | 348/701 |

FOREIGN PATENT DOCUMENTS

| | | |
|---|---|---|
| CN | 1783995 A | 6/2006 |
| EP | 1 874 055 A2 | 1/2008 |
| WO | WO 2008/057563 A2 | 5/2008 |

OTHER PUBLICATIONS

Communication pursuant to Article 94(3) EPC corresponding to European Patent Application No. 07 869.897.4-2223, dated Jul. 2, 2010.
PCT International Search Report for PCT/US2007/088813, (PCT/ISA/210), Jun. 10, 2008, International Searching Authority/European Patent Office, Rijswijk, Netherlands.

* cited by examiner

*Primary Examiner* — Paulos Natnael
(74) *Attorney, Agent, or Firm* — Thomas, Kayden, Horstemeyer & Risley, LLP

(57) ABSTRACT

A video processor, upstream of a frame rate converter determines video attribute data. This attribute data is formatted and passed along a channel to the frame rate converter. The frame rate converter extracts the attribute data from the channel for use in frame rate conversion. The frame rate converter may thus rely on attribute data obtained by the video processor, and need not re-analyze video frames.

21 Claims, 4 Drawing Sheets

VIDEO PROCESSOR ARCHITECTURE AND METHOD FOR FRAME RATE CONVERSION

CROSS-REFERENCE TO RELATED APPLICATIONS

This application is related to U.S. patent application Ser. No. 11/616,192 entitled "LOW LATENCY CADENCE DETECTION FOR FRAME RATE CONVERSION", filed concurrently herewith, the contents of which are hereby incorporated herein by reference.

FIELD OF THE INVENTION

The present invention relates generally to video processing, and more particularly to video devices capable of frame rate conversion.

BACKGROUND OF THE INVENTION

Moving picture video is typically recorded or encoded at a pre-determined frame rate. For example, cinema films are typically recorded at a fixed rate of 24 frames per second (fps). Video as broadcast for television in accordance with the NTSC standard, on the other hand, is encoded at 30 fps. Video broadcast in accordance with European PAL or SECAM standards is encoded at 25 fps.

Conversion between frame rates has created challenges. One common technique of converting frame rates involves dropping or repeating frames within a frame sequence. For example, telecine conversion (often referred to as 3:2 pull down) is used to convert 24 fps motion picture video to 60 fields per second (30 fps). Each second frame spans 3 video fields, while each other second frame spans two fields. Telecine conversion is, for example, detailed in Charles Poynton, Digital Video and HDTV Algorithms and Interfaces, (San Francisco: Morgan Kaufmann Publishers, 2003), the contents of which are hereby incorporated by reference.

Various other techniques for frame rate conversion are discussed in John Watkinson "The Engineer's Guide to Standards Conversion", Snell and Wilcox Handbook Series.

More recently, frame rate conversion has not only been used for conversion between formats and standards, but also to enhance overall video quality. For example, in an effort to reduce perceptible flicker associate with conventional PAL televisions, high frame rate 100 fields per second (50 fps) televisions have become available.

In the future, higher frame rates may become a significant component in providing higher quality home video. Existing video, however, is not readily available at the higher frame rate. Accordingly, frame rate conversion will be necessary. Such conversion, in real time presents numerous challenges, arising at least in part from the requirements to analyse incoming video in order to form higher rate video. This is exacerbated in current video receivers in which frame rate conversion and other video processing function independently.

Accordingly, there is a need for improved frame rate conversion techniques.

SUMMARY OF THE INVENTION

Exemplary of embodiments of the present invention, video attribute data is determined at a video processor, upstream of a frame rate converter (FRC). This attribute data is formatted and passed along a channel to the FRC, for use by the FRC. In this way, the FRC may rely on attribute data obtained by the video processor, and may avoid having to re-analyze video frames. Conveniently, attribute data may be available with received frames and thereby quickly acted upon by the FRC, reducing latency.

In accordance with an aspect of the present invention, there is provided a method of forming frame rate converted video. The method comprises processing received video to form data representing frames of video; obtaining attribute data from the received video; passing the data representing frames of video to a frame rate converter; passing the attribute data in an auxiliary channel to a frame rate converter; receiving the data representing frames of video; receiving the attribute data on the auxiliary channel; and forming frame rate converted video from the data representing frames of video, based on the attribute data.

In accordance with yet another aspect of the present invention, there is provided a video receiver comprising: a video processor comprising a de-interlacer for deinterlacing received fields of video to form frames of video for provision to a frame rate converter. The de-interlacer is operable to detect a cadence of the received fields of video. The video receiver further comprises an attribute formatter in communication with the video processor for receiving an indication of the cadence and forming attribute data therefrom. A channel encoder encodes the attribute data on a channel to the frame rate converter.

In accordance with another aspect of the present invention, there is provided a video receiver comprising: a video processor comprising a plurality of video processing blocks, each for performing at least one video processing function on received video to form frames for provision to a frame rate converter, each of the video processing blocks operable to obtain attribute information about the received video; an attribute formatter in communication with the video processor for receiving the attribute information from the video processing blocks and forming attribute data therefrom; and a channel encoder for encoding the attribute data on a channel to the frame rate converter.

In accordance with another aspect of the present invention, there is provided a method of forming frame rate converted video. The method comprises receiving data representing frames of video at a frame rate converter; receiving at the frame rate converter, attribute data associated with the data representing frames on an auxiliary channel; forming frame rate converted video from the received data, based on the attribute data.

In accordance with yet another aspect of the present invention, there is provided a frame rate converter comprising a channel decoder for decoding attribute information about frames of video provided to the frame rate converter; and an interpolator for forming frame rate converted video from data representing the frames of video, based on the attribute information.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
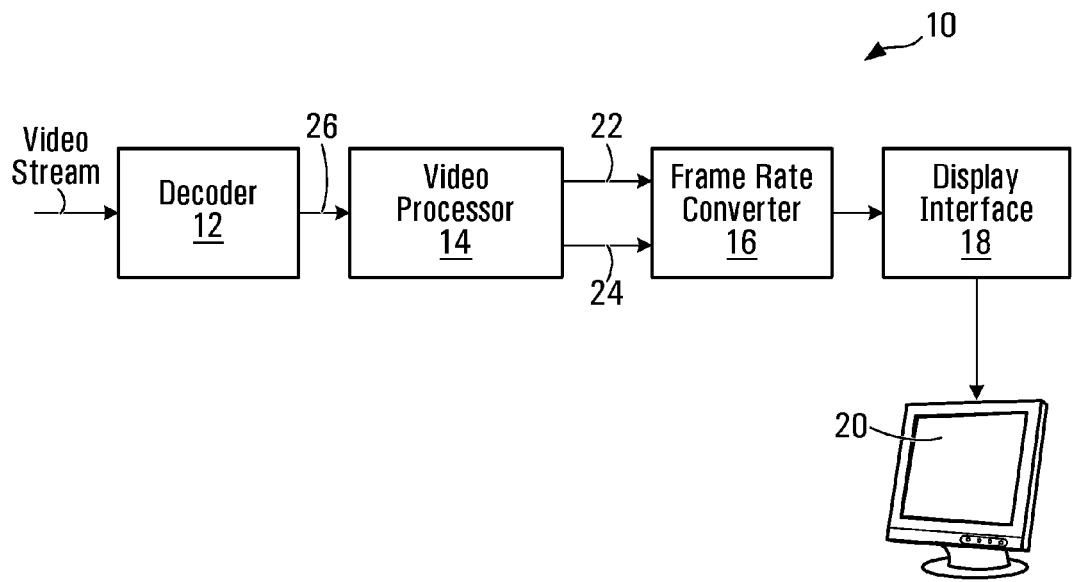
FIG. 1 is a simplified schematic block diagram of a video receiver, exemplary of an embodiment of the present invention.

FIG. 1 is a schematic block diagram of video receiver 10, exemplary of an embodiment of the present invention. As illustrated video receiver 10 includes a video decoder 12, a video processor 14, a frame rate converter (FRC) 16, and a display interface 18. Video receiver 10 may take the form of a set top box, satellite receiver, terrestrial broadcast receiver, media player (e.g. DVD player), media receiver, or the like. Receiver 10 (or portions thereof) may optionally be integrated in a display device, such as a flat panel television, computer monitor, portable television, hand-held device (such as a personal digital assistant, mobile telephone, video player), or the like.

Receiver 10 may be formed in custom hardware, or a combination of custom hardware and general purpose computing hardware under software control.

As will become apparent, video receiver 10 receives video, in the form of a video broadcast, digital video stream or the like. Decoder 12, in turn decodes the received video to form video fields or frames. Video processor 14 processes the decoded fields or frames, to scale, de-interlace, and otherwise manipulate the received video. FRC 16 converts the frame rate of processed video in order to generate video at a desired frame rate, different from that of the decoded video. Resulting higher rate frames are presented by display interface 18 on a display 20, for viewing. Display interface 18 may sample or receive frame video generated by FRC 16 to present images for display.

Display interface 18 may, for example, take the form of a conventional random access memory digital to analog converter (RAMDAC), a single ended or differential transmitter conforming to the HDMI or DVI standard, or any other suitable interface that converts data for display in analog or digital form on display 20.

As video is decoded and processed by video processor 14, video attribute information suitable for use by FRC 16 in performing frame rate conversion of the received video may be extracted. The attribute information is passed downstream, from video processor 14 to FRC 16. In the depicted embodiment, two separate channels 22, 24 may be used to pass video data and attribute data from video processor 14 to FRC 16. FRC 16, in turn, uses the received attribute data, and need not analyse decoded video frames to obtain (e.g. extract, determine, calculate, etc.) identical or similar attribute information.

More specifically, video decoder 12 decodes a received video signal into a stream of pixel values. The video signal arriving at video decoder 12, may originate with any conventional source, such as a satellite, or cable television channel, terrestrial broadcast channel, local video archive or peripheral device such as a DVD player. The video signal may be analog or digital. Decoder 12 may thus take the form of a conventional video decoder, compliant with any one of a number of video encoding/compression standards, such as MPEG, MPEG 2, MPEG 4, divX, ITU Recommendation ITU-H.264, HDMI, ATSC, PAL or NTSC television, digital television (e.g. ITU BT.601) or the like.

Figure 2:
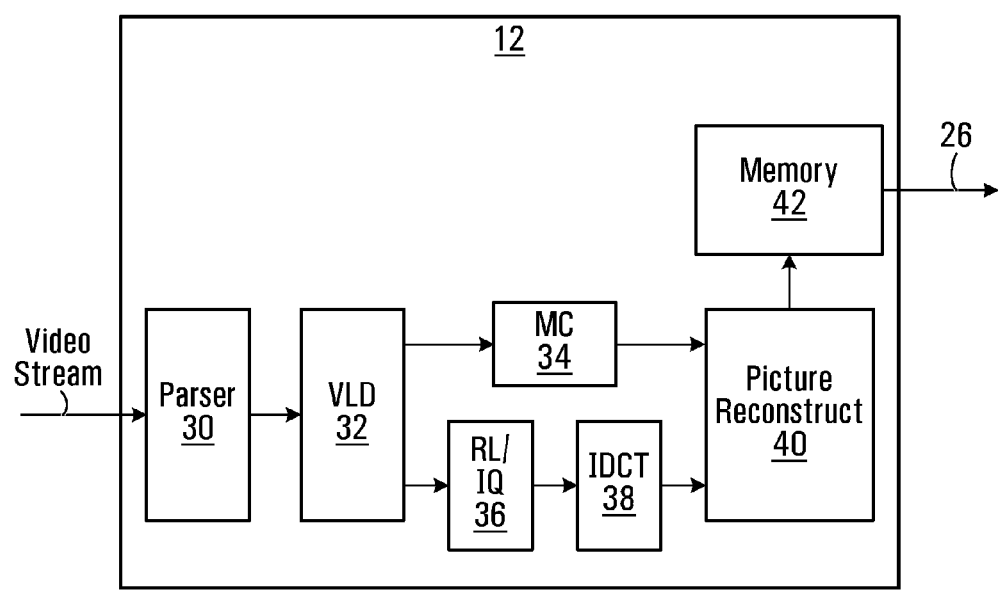
FIG. 2 is a simplified schematic block diagram of a video decoder forming part of the device of FIG. 1.

For ease of explanation, an example video decoder 12 is exemplified in FIG. 2, as an MPEG compliant decoder, and as such includes a parser 30 for parsing the received video stream, a variable length decoder (VLD) 32, a motion compensation block (MB) 34, a run length decoder and inverse quantization (RL & IQ) block 36, an inverse discrete cosine transform block (IDCT) 38, a picture reconstruction block 40 and memory 42 for storing frames/fields, as found in conventional MPEG decoders and known to those of ordinary skill. Decoder 12 is in communication with video processor 14 by way of link 26. Link 26 may be a serial or parallel link.

Figure 3:
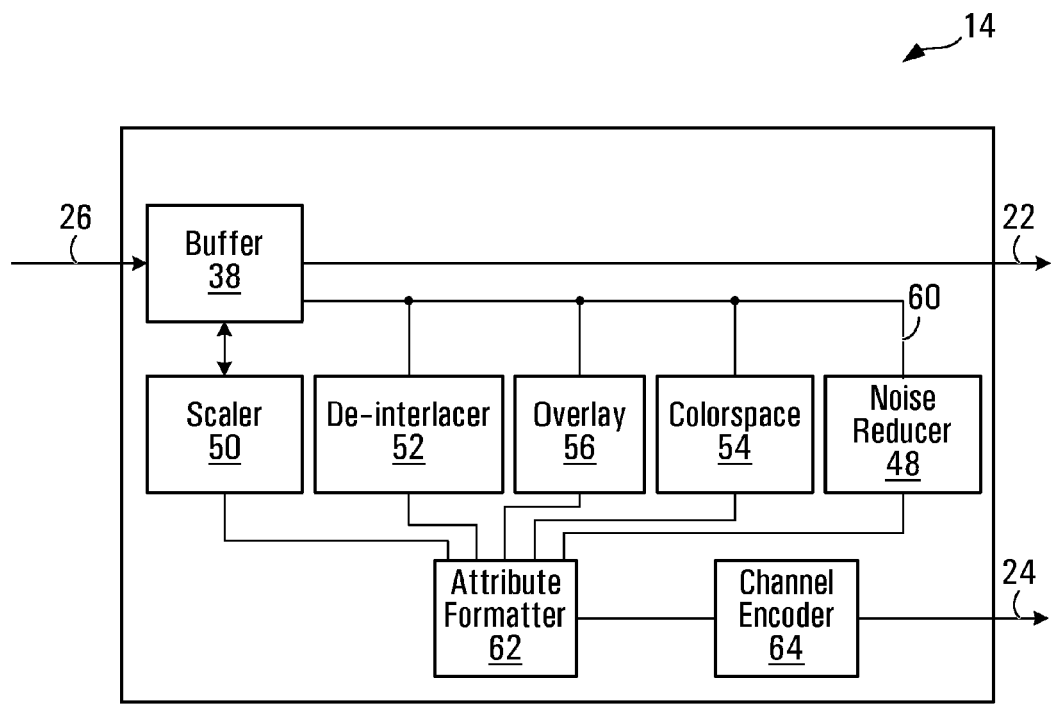
FIG. 3 is a simplified schematic block diagram of a video processor forming part of the device of FIG. 1.

An example video processor 14 is depicted in FIG. 3. As illustrated, video processor 14 includes at least one buffer in memory 58 to buffer pixel values received from video decoder 12. Exemplary video processor 14 includes several functional blocks to process video. Each functional block may perform a single function Example video processor 14 includes a scaler 50, a de-interlacer 52, a color space converter 54, an effects/overlay engine 56, and a noise reduction block 48. A person of ordinary will readily appreciate that video processor 14 could include additional functional blocks not specifically illustrated.

An internal bus 60 interconnects scaler 50, de-interlacer 52, color space converter 54, an effects/overlay engine 56, and memory 58.

An attribute formatter 62 is further in communication with the remaining functional blocks of video processor 14. Attribute formatter 62, receives video attribute information from scaler 50, de-interlacer 52, color converter 54, and effects/overlay engine 56, and noise reducer 48. A further channel encoder 64 may further format attribute data as formatted by attribute formatter 62, for transmission on channel 24 to FRC 16 (FIG. 1).

Figure 4:
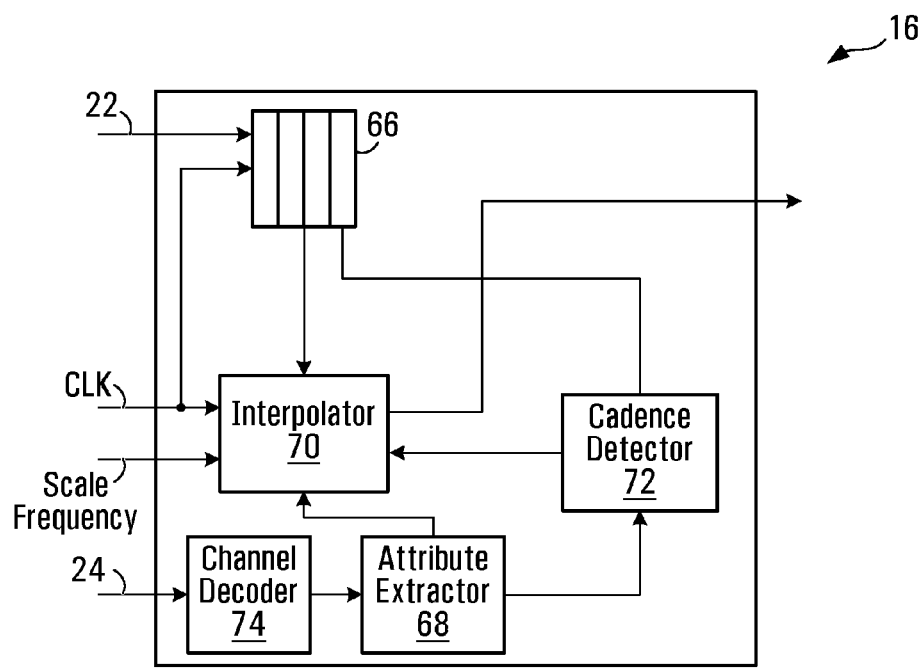
FIG. 4 is a simplified schematic block diagram of a frame rate converter forming part of the device of FIG. 1.

An example, FRC 16 is more particularly depicted in FIG. 4. As illustrated, example FRC 16 includes a buffer 66, an interpolator 70 that interpolates frames within buffer 66 in order to allow for frame-rate conversion. Buffer 66 may be first in, first out frame buffer used to store sequential frames that may be combined by interpolator 70. Buffer 66, may for example store four sequential frames F, for interpolation. Frame rate converter 16 further includes a channel decoder 74 and attribute decoder 68, complementary to channel encoder 64 and attribute encoder 62.

Interpolator 70 functions to interpolate frames in buffer 66, to form output frames at a frame rate (frequency) equal to the frequency of arriving frames at buffer 66, multiplied by a scaling factor SCALE_FREQU. A clock signal (CLK) times the arrival of the frames, and allows FRC 16 to derive the resulting frame rate. As FRC 16 produces more than one frame for each received frame, interpolator 70 functions to form interpolated frames, representative of motion between frames buffered in buffer 66. Such motion compensated interpolation is performed by frame rate converter 16, from two input frames in buffers 66.

Motion compensation/interpolation techniques that may be performed by interpolator 70 are generally discussed in Keith Jack, Video, 2005, Demystified (A handbook for the Digital Engineer), 4$^{th}$ ed., and Watkinson, John, The Engineer's Guide to Standards Conversion, Snell and Wilcox Handbook Series (http://www.snellwilcox.com/community/knowledege center/egineering/estanda rd.pdf), the contents of both of which are hereby incorporated by reference, and more specifically in U.S. patent application Ser. No. 11/616,192, naming the inventor hereof, and filed concurrently herewith.

Figure 5:
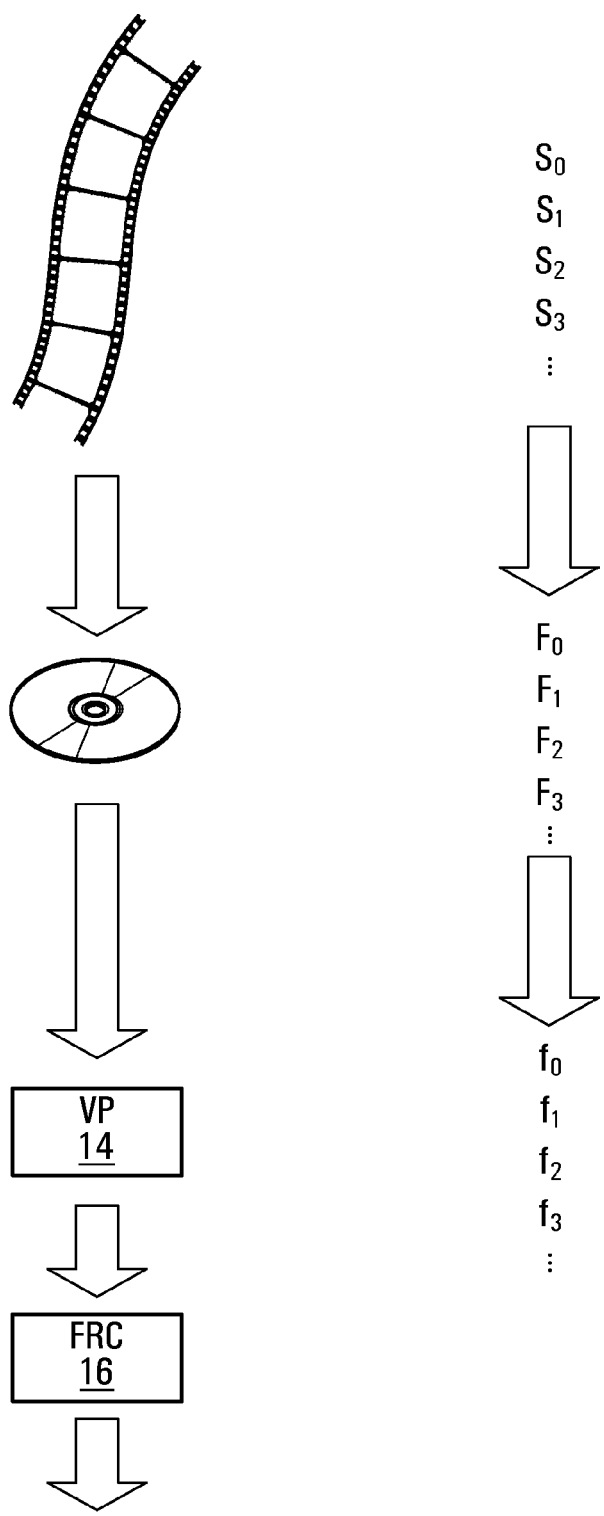
FIG. 5 schematically illustrates frames in frame rate converted output; decoded/processed output; and an original video source.

For clarity, as described herein, buffered frames (e.g. decoded frames output by video processor 14) are referred to as frames $F_0, F_1, F_2, \ldots F_n$, while unique frames in the video source are referred to as frames $S_0, S_1, S_2, \ldots$. Thus, for example, a 24 fps source may have source frames $S_0, S_1, S_2, S_3 \ldots$ and may have been converted to telecine format that would be decoded and/or reconstructed by video decoder 12 as fields or frames, and thereafter de-interlaced (if required) by video processor 14 to form frames $\{F_0, F_1, F_2, F_3, F_4, F_5, F_6, F_7, F_8, F_9, \ldots\}$ (at 60 fps) corresponding to source frames $\{S_0, S_0, S_0, S_1, S_1, S_2, S_2, S_2, S_3, S_3 \ldots\}$. Telecine converted frames $F_0, F_1, \ldots$ or fields may be stored on a recording medium, such as a DVD or the like, or broadcast using terrestrial, satellite or CATV broadcast techniques, in either analog (e.g. NTSC) format, or in digital format (e.g. MPEG stream, or the like), or be otherwise provided. Output frames, with converted frame rate, in turn will be referred as frames $f_0, f_1, f_2 \ldots f_n$, and may be formed from frames $F_0, F_1, \ldots$, as detailed herein. This is schematically illustrated in FIG. 5.

Interpolated frames are also denoted as $I\{S_j, S_{j+1}, I/m\}$, herein. This notation signifies a resulting motion interpolated frame that represents an intermediate frame between the original frames $S_j, S_{j+1}$, interpolated to represent fractional $I/m$ motion from $S_j$ to $S_{j+1}$. For example, an interpolated frame $I\{S_j, S_{j+1}, \frac{1}{2}\}$, is a frame formed to represent motion halfway between $S_j$ and $S_{j+1}$. Such motion interpolation is performed by frame rate converter 16, from two input frames in buffers 66.

Figure 6:
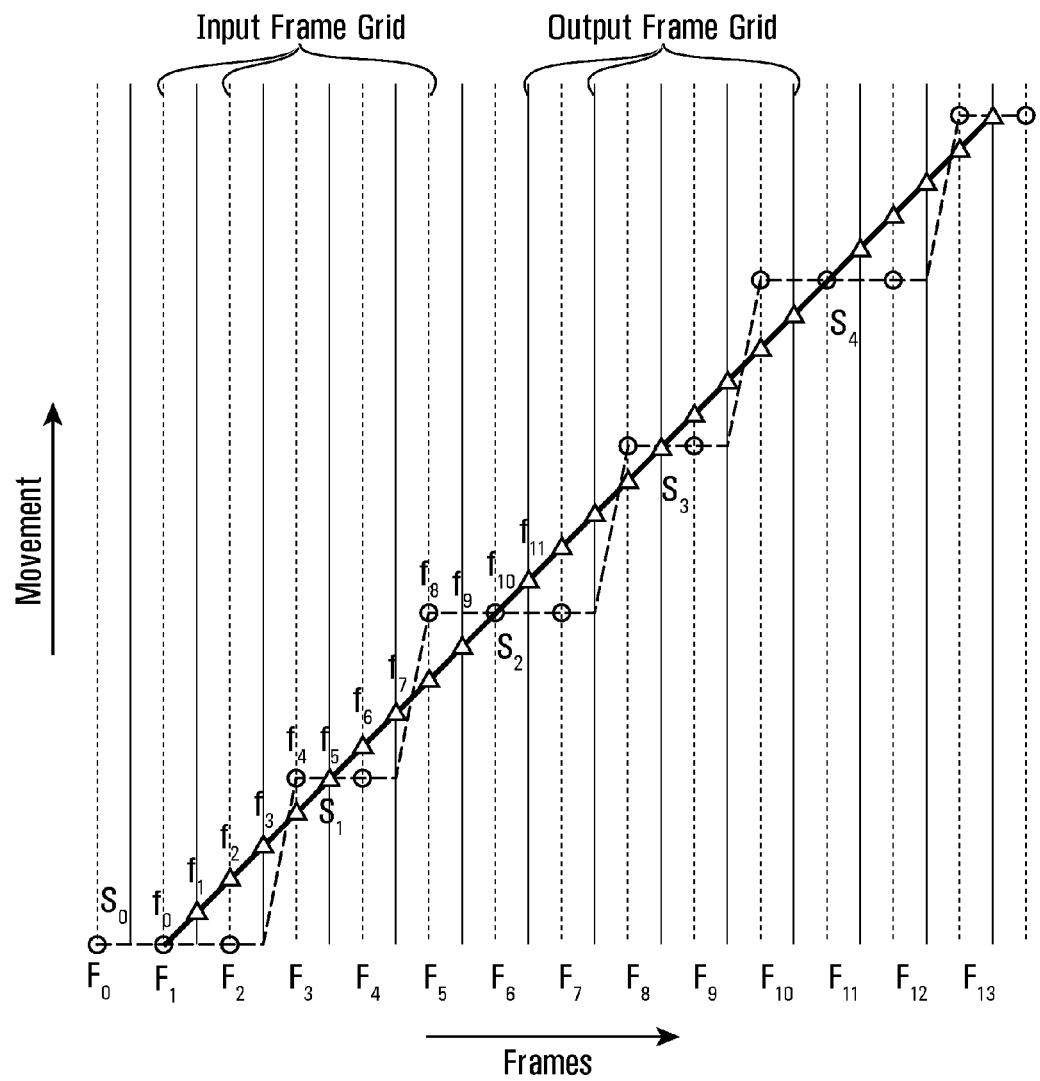
FIG. 6 is a motion graph illustrating motion in a frame rate converted video output from a decoded frame sequence, exhibiting a 3:2 pull-down pattern.

FIG. 6 is a graph depicting decoded/processed video frames and frame rate converted frames. Decoded/processed video frames are indicated along the dotted line; interpolated video frames are indicated along the solid line. Decoded/processed video frames are represented by a circle, while interpolated frames are represented as triangles.

As should now be appreciated, the degree of interpolation between decoded/processed frames, as well as which frames are to be interpolated by interpolator is dependent on the cadence of the decoded/processed video frames F. For example, in the presence of 3:2 pull-down pattern and frequency scaling ratio of two (SCALE_FREQU=2), interpolator 70 causes motion in each interpolated frames to advance in fractional fifths of the source frames; in the presence of 2:2 pull-down, in fractional fourths; and in the presence of no pull-down in fractional halves.

FIG. 6 illustrates motion in an example frame sequence, as output by video processor 14. More specifically, FIG. 6 illustrates the motion of an example frame sequence, $F_0, F_1, F_2, F_3 \ldots$ output by video processor 14. The depicted frame sequence originates with a 3:2 pull-down source, typically resulting from a conversion of 24 frames per second (denoted as source frames $S_0, S_1, S_2, S_3 \ldots$) to 60 interlaced fields per second, converted to 60 fps frames. As such, each second frame in the original (cinema) source is sampled twice, while every other second frame in the original source is sampled three times. Resulting frames $F_0, F_1, F_2, F_3$ exhibit the 3:2 pull-down pattern as they are formed by de-interlacing the interlaced fields.

The resulting frame sequence, exhibits jerky motion (referred to as "judder"), with motion only after the $3^{rd}, 5^{th}, 8^{th}, 10^{th}$, etc. decoded frame. This judder remains after frame rate conversion that does not account for the cadence of the video source.

In an effort to remove or reduce perceptible judder, frame rate converter 16 interpolates adjacent source frames, in order to form a rate converted frame sequence.

In operation, a video stream is received by video decoder 12, video decoder 12, in turn, parses the stream and forms a series of fields or frames, having a particular resolution. The series of fields or frames is provided as a pixel stream to video processor 14. The format of the decoded video is typically dictated by format of the encoded video. For example, horizontal, vertical resolution; aspect ratio; color format; and whether or not the video is provided as frames or field, for example, is dictated by the video's encoding.

At video processor 14, scaler 50, deinterlacer 52, color converter 54, and overlay engine 56, operate in conventional manners to provide frames of output video. In so processing the video, scaler 50, deinterlacer 52, color converter 54 and overlay engine 56, extract and/or create video attribute data. The order of operation of scaler 50, deinterlacer 52, color converter 54, and overlay engine 56 is not significant, and may be varied based on design objectives.

For example, scaler 50 may scale the decoded video to a desired size and aspect ratio. To do so, scaler 50 may optionally otherwise analyze the received frame to assess whether or not any regions of the received video contains black bars, the frequency content of the video, and the like. This attribute may be further used by scaler 50 to scale the decoded video. For example, the frequency content of the decoded frame could be provided as data representing a histogram; the beginning and end line and/or column of a matted (e.g. letter box) video image could be provided. Attribute data, including that received from decoder 12, and that formed by scaler 50 may also be passed downstream to attribute formatter 62.

Likewise, de-interlacer 52 may be used to convert interlaced fields of video to frames by first analyzing the sequence of received video fields to determine their cadence as for example detailed in U.S. patent application Ser. Nos. 10/837,835 and 11/381,254. Using this cadence information, received fields may be combined by de-interlacer to form de-interlaced frames of video. Video fields may, for example, be bobbed and weaved to form frames. As one frame of video is formed for each two fields, the cadence of the frame sequence will continue to reflect the cadence of the field sequence. This is, for example, detailed in U.S. patent application Ser. No. 11/616,192, filed concurrently herewith, and referred to above. Cadence information, as detected by de-interlacer 52 is provided to attribute formatter 62. The cadence information may, for example, include several bits identifying the cadence as determined by de-interlacer 52. Example detected cadence may include the 3:2 pull-down pattern; 2:2 pull-down pattern; 3:3 pull-down pattern, or the like. Similarly, the absence of cadence (i.e. no cadence) may also be signalled to attribute formatter 62. Optionally, a scene change could be signalled by de-interlacer to attribute formatter 62.

Color space converter 54, likewise may convert the color space of the received video fields/frames to a desired color space. Data representing the resulting color space may also be passed downstream to attribute formatter 62. Similar, data representing an indicator of luma or gamma in the video and the like, (e.g. as a histogram of luma distribution, gamma information, and the like) could be signaled by color space converter 54 to attribute formatter 62.

Overlay/effects engine 56, may format the received video fields/frames to present the video in a particular format, as for example, picture-in-picture; picture-on-picture; or in conjunction with static images (e.g. TV guide, or the like). Attribute formatter 62 may receive the co-ordinates of each picture; context information, describing the nature of each overlay (e.g. computer generated, video, static, images, etc.) from overlay/effects engine 56.

Noise reduction block 48, may filter the received video to remove noise and/or artifacts. Attribute formatter 62 may receive information about the noise level, signal type, signal level and the like from noise reduction block 48.

So, attribute formatter 62, receives video attributes from the remaining functional blocks, such as scaler 50, de-interlacer 52, color converter 54, overlay engine 56, and noise reduction block 48. Attribute formatter 62 may format these in a suitable format so that these may be encoded on channel 24 and explicitly passed downstream to FRC 16.

Attribute formatter 62 formats the attribute data in a suitable format to accompany video frames generated by processor 14. For example, for each frame, attribute formatter 62 may encode attributes about that frame, and packetize this information. The actual format of each packet is somewhat arbitrary. The packet may take the form of bits, or bytes representing attribute information. The packet could alternatively contain text data identifying the attributes of interest, or could be formatted using a formatting language such as XML. Attribute formatter 62 may alternatively format attribute data in accordance with ITU Recommendation ITU-BT.1364-1, or in other ways understood by those of ordinary skill.

In any event, attribute data as formatted by attribute formatter 62 is passed downstream to channel encoder 64. Channel encoder 64 encodes the attribute data in an auxiliary channel in such a way that the encoded data remains synchronized with frames output by video processor 14. The auxiliary channel may take any form. For example, attribute data may be passed along a dedicated channel that may be provided by way of separate physical link, or that may be multiplexed with video or other data. One or more packets of attribute data may be generated with each frame. Channel encoder 64 include a multiplexer, and may format the attribute channel and multiplex it with video data to occupy unused portions of the video data (e.g. vertical blank or horizontal blank intervals), or the like. Similarly, channel encoder 64 could encode a separate physical channel that could carry data that is in some way synchronized to the video data. For example, the channel could be a synchronous stream, or an asynchronous carrying a packet transmitted with each frame.

At FRC 16, video data from video processor 14 is buffered in buffer 66, and attribute data is extracted from the attribute channel by channel decoder 74, and attribute extractor 68. Resulting attribute information may be provided to interpolator 70, and optionally to cadence detector 72.

If the attribute information includes cadence information about the incoming frame sequence, cadence detector 72 may be disabled, or cadence data generated by it may be ignored. Otherwise, if the auxiliary data does not include cadence information about the video, cadence detector 72 may determine cadence information from frames buffered in buffer 66, as detailed in U.S. patent application Ser. No. 11/616,192, filed concurrently herewith and identified above. Cadence information determined by detector 72 may only be determined after a particular frame has been buffered, and may thus lag the cadence information available from video processor 14, by one frame.

Conveniently, other attribute data extracted by attribute decoder 68 may be used by FRC 16 to adjust operating parameters of FRC 16, to improve interpolation. For example, overlay context attribute data may be used by FRC to independently process overlay regions. Luma information could be used to pre-filter the interpolated frames (e.g. scenes could be filtered differently based on their darkness). Gamma information could be used to do de-gamma first and then re-gamma. Frequency information about the video could be used to adjust or select filters of FRC 16, and its sensitivity. Information reflecting the type of noise and signal level could similarly be used to adjust filters and sensitivity of FRC 16. Other uses of attribute data by FRC 16 will be readily apparent to those of ordinary skill.

In particular, FRC 16 is provided with an identifier of the pull-down pattern by video processor 14 to perform interpolation, in order to produce motion compensated, interpolated frames from the original source frames. In order to accurately interpolate, the cadence indicator may be used to interpolate different (as opposed to repeated) frames in the source, and to adjust interpolation parameters (e.g. desired fractional motion from interpolated frame to interpolated frame).

FIG. 6 illustrates motion in a desired output frame sequence $f_0, f_1, f_2, f_3 \ldots$ output by frame rate converter 16, from a frame sequence $F_0, F_1, F_2 \ldots$. In FIG. 6, motion is depicted as a function of frame number. In the depicted example, frame rate converter 16 doubles the frame rate (i.e. SCALE_FREQU=2). As more frames are output by frame rate converter 16, than originally produced by video processor 14, interpolator 70 (FIG. 2) of frame rate converter 16 uses conventional motion compensation techniques in order to produce frames for presentation at the higher rate. In the depicted embodiment, each interpolated frame $f_j$ is either identical to a frame $F_i$ output by video processor 14, or formed from two adjacent source frames in the decoded frame sequence (e.g. $S_i, S_{i+1}$). Of course, more than two adjacent source frames could be used in producing interpolated frames.

In the illustrated example, motion compensation is performed to produce relatively smooth motion, and to reduce judder. In the depicted embodiment, motion is linearly interpolated, with equal motion between each of frames $f_0, f_1, f_2, f_3$, and so on. As sequential source frames S are not decoded at equal time intervals, any linearly interpolated sequence $f_0, f_1, f_2, f_3 \ldots$ will typically not include frames corresponding to frames $S_0, S_1, \ldots$ in the source, at the same times as these are decoded by video processor 14.

Notably, $f_0=F_1$, while $f_1, f_2, f_3$, and $f_4$ are derived from an interpolation of $F_0$ (or equivalent frames $F_1$ or $F_2$) and $F_3$ (i.e. source frame $S_0$ and $S_1$). Each interpolated frame $f_1, f_2, f_3$, and $f_4$ advances motion from $F_0$ to $F_3$ (i.e. from frame $S_0$ to frame $S_1$ of the original source). Output frame $f_5$ is original source frame $S_1$ (i.e. frame $F_3/F_4$). Output frame $f_6$, and $f_7$ are similarly derived from decoder frames $F_3/F_4$ and $F_5$ (corresponding to source frames $S_1$ and $S_2$).

In the presence of a 3:2 pull-down pattern, FRC 16 relies on buffered frames that are up to three frames apart (i.e. $F_0$ and $F_3$; $F_3$ and $F_5$), FRC 16 will introduce a processing delay of at least this many frames. Thus $f_1$ is produced no earlier than after decoding of $F_3$. Similarly, $f_6$ is produced no earlier than after decoding $F_5$; and $f_{11}$ is produced no earlier than after decoding $F_8$.

Now, in the case 3:2 pull-down pattern and a frequency scaling of two, ten output frames are ideally produced for every five (3+2) buffered frames. This is also apparent in FIG. 6. Resulting frames $f_0, f_1, f_2, f_3, f_4, f_5 \ldots f_{10}$ correspond to $S_0$, $I\{S_0, S_1, 1/5\}$, $I\{S_0, S_1, 2/5\}$, $I\{S_0, S_1, 3/5\}$, $I\{S_0, S_1, 4/5\}$, $S_1$, $I\{S_1, S_2, 1/5\}$, $I\{S_1, S_2, 2/5\}$, $I\{S_1, S_2, 3/5\}$, $I\{S_1, S_2, 4/5\}$, $S_2$.

By contrast, the resulting frame pattern $f_0, f_1, f_2, f_3 \ldots f_{10}$ for a 2:2 pull-down source would correspond to frames $S_0$, $I\{S_0, S_1, 1/4\}$, $I\{S_0, S_1, 1/2\}$ $I\{S_0, S_1, 3/4\}$, $S_1$, $I\{S_1, S_2, 1/4\}$, $I\{S_1, S_2, 1/2\}$, $I\{S_1, S_2, 3/4\}$, $S_2$, $I\{S_2, S_3, 1/4\}$, $I\{S_2, S_3, 1/2\} \ldots$. That is, four output frames are produced for every buffered frame.

Similarly, the resulting frame pattern for no pull-down pattern (e.g. resulting from interlaced video) would corresponds to frames $S_0, I\{S_0, S_1, \frac{1}{2}\}, S_1, \{S_1, S_2, \frac{1}{2}\}, S_2, \{S_2, S_3, \frac{1}{2}\}$ .... Two output frames are produced for every buffered frame.

Of course, depending on the cadence of the decoded frames F, the location of source frames S in buffer 66 will vary.

Conveniently, attribute data is available with processed frames, as received by video processor 14. As such, FRC 16 may react quickly to the provided attribute data. For example, as the cadence of the video provided by video processor 14 changes, interpolation parameters used by FRC 16 may be adjusted. Thus, as soon as a change from a recognized pull-down pattern to no cadence is detected, interpolation may proceed to form interpolated frames corresponding to source frames $S_0, I\{S_0, S_1, \frac{1}{2}\}, S_1, \{S_1, S_2, \frac{1}{2}\}, S_2, \{S_2, S_3, \frac{1}{2}\}$ .... As attribute data is available with video data, latency required by analysis may be reduced.

As will be appreciated, attribute data provided to FRC 16 need not originate with video processor 14. Instead, attribute data could originate elsewhere upstream of FRC 14. For example, additional attribute data or some of the attribute data described could be obtained by decoder 12. For instance, motion vector data could be extracted by any MPEG or similar decoder used to form decoder 12; the source and/or type of decoded video (CVBS, component, digital, progressive, interlaced, VGA) could be passed as attribute data. Again, other attribute data available upstream of FRC 14 will be apparent to those of ordinary skill.

As should now also be appreciated, a video received need not include decoder 12. Instead, decoded video from an external source could be provided to a video device exemplary of an embodiment of the present invention, including only video processor 14, frame rate converter 16, and optional display interface 18.

Similarly, video processor 14 and FRC 16 could be formed in different physical devices. For example, video processor 14 could form part of a video receiver, video player, dedicated video processor or the like, while FRC 16 could form part of a display device, such as a flat panel display. The link between video processor 14 and FRC 16 could then be a physical link, complying with a video interconnect standard, such as the DVI or HDMI standard. Channels 22 and 24 may then be channels carried by the interconnect. For example, channels 22 and 24 could be carried on an HDMI interconnect.

Further, although attribute data has been described as being provided synchronously, it may also be buffered at video processor 14, and may be extracted or pulled from video processor 14, by FRC 16 or some other processor (such as a host processor). Video processor 14 may accordingly include sufficient storage memory for storing attribute data and provide a suitable interface (such as a software application programmer interface (API)) for querying the data. Optionally video processor 14 may buffer the attribute data for several frames. The attribute data may then be queried as required.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of forming frame rate converted video comprising:
   a. processing received video to form data representing frames of video;
   b. obtaining attribute data from said received video;
   c. passing said data representing frames of video to a frame rate converter;
   d. passing said attribute data in an auxiliary channel to a frame rate converter;
   e. receiving said data representing frames of video;
   f. receiving said attribute data on said auxiliary channel;
   g. determining said attribute data does not include cadence information about said received video, and in response thereto further comprises determining said cadence information from frames buffered at said frame converter;
   h. forming frame rate converted video from said data representing frames of said video, based on said attribute data, wherein forming frame rate converted video data comprises interpolating frames.

2. The method of claim 1, wherein said processing comprises de-interlacing said received video to form said frames.

3. The method of claim 2, wherein said de-interlacing comprises determining a cadence of said received video, and wherein said attribute data comprises cadence information.

4. The method of claim 1, wherein said auxiliary channel is multiplexed with said data representing frames of data.

5. The method of claim 1, wherein said attribute data in said auxiliary channel is synchronized with said frames of video so that any attribute data is associated with a particular one of said frames, and further comprising adjusting interpolation parameters used by a frame rate converter based on said attribute for forming frame rate converted data.

6. The method of claim 1, wherein said attribute data comprise frequency content of said frames of video.

7. The method of claim 1, wherein said attribute data comprises and indicator of luma content of said frames of video.

8. The method of claim 1, wherein said attribute data comprises attribute information about an overlay in said frames of video.

9. The method of claim 1, further comprising multiplexing said data representing frames of video, and said attribute data in an auxiliary channel.

10. The method of claim 1, wherein said data and said attribute data are passed on an HDMI interconnect.

11. The method of claim 1, wherein said passing said attribute data comprises querying a video processor for said attribute data.

12. A video receiver comprising:
   a. a video processor comprising a de-interlacer for deinterlacing received fields of video to form frames of video for provision to a frame rate converter, said de-interlacer operable to detect a cadence of said received fields of video, wherein said video processor further comprises at least one of a noise reduction block, a color converter, and a scaler;
   b. an attribute formatter in communication with said video processor for receiving an indication of said cadence and forming attribute data therefrom, wherein said attribute data further comprises at least one of information reflecting frequency content of said frames, and information reflecting color content of said frames of video;
   c. a channel encoder for encoding said attribute data on a channel to said frame rate converter; and
   wherein said frame rate converter comprises an interpolator for interpolating frames.

13. The video receiver of claim 12, wherein said channel encoder comprises a multiplexer for multiplexing said frames of video and said attribute data.

14. The video receiver of claim 12, further comprising a video decoder for decoding a received video stream, and providing said fields of video to said video processor.

15. A method of forming frame rate converted video comprising:
   a. receiving data representing frames of video at a frame rate converter;
   b. receiving at said frame rate converter, attribute data associated with said data representing frames on an auxiliary channel;
   c. forming frame rate converted video from said received data, based on said attribute data, wherein forming frame rate converted video further comprises interpolating frames, wherein said attribute data comprises cadence information about said frames of video, and wherein said cadence information is used to adjust fractional motion from interpolated frame to interpolated frame, formed by an interpolator.

16. The method of claim 15, further comprising buffering sequential ones of said received frames.

17. A frame rate converter comprising:
   a. a channel decoder for decoding attribute information about frames of video provided to said frame rate converter;
   b. an interpolator for forming frame rate converted video from data representing said frames of video, based on said attribute information, wherein the interpolator interpolates frames; and
   c. a cadence detector for determining cadence information from said sequential ones of said received frames, if said attribute information does not include said cadence information the frame rate converter further comprising a buffer fir storing sequential ones of said frames of video.

18. The frame rate converter of claim 17, wherein said attribute information comprises cadence information about said frames of video.

19. The frame rate converter of claim 18, wherein said attribute information is used to adjust fractional motion from interpolated frame to interpolated frame, formed by said interpolator.

20. The frame rate converter of claim 17, wherein said attribute information comprises information about frequency content in frames of video provided to said frame rate converter.

21. A video display device comprising the frame rate converter of claim 17.

\* \* \* \* \*

UNITED STATES PATENT AND TRADEMARK OFFICE
CERTIFICATE OF CORRECTION

PATENT NO. : 8,134,640 B2  
APPLICATION NO. : 11/616188  
DATED : March 13, 2012  
INVENTOR(S) : Doswald Page 1 of 1

It is certified that error appears in the above-identified patent and that said Letters Patent is hereby corrected as shown below:

In the Claims

Column 10, lines 9-10, Claim 1, replace "a frame rate convertor" with "said frame rate convertor".

Column 10, line 26, Claim 3, replace "cadence information" with "said cadence information".

Column 10, line 33, Claim 5, replace "a frame rate converter" with "said frame rate convertor".

Column 10, line 38, Claim 7, replace "and indicator" with "an indicator".

Column 12, line 9, Claim 17, replace "fir" with "for".

Signed and Sealed this  
Thirtieth Day of December, 2014

Michelle K. Lee  
*Deputy Director of the United States Patent and Trademark Office*